March 18, 1958 E. L. STROUP 2,827,115
UPWARDLY ACTING DOOR ASSEMBLY AND SECTIONS THEREFOR
Filed July 29, 1955 2 Sheets-Sheet 1

INVENTOR.
Earl L. Stroup
BY
Otto a. Earl
Attorney.

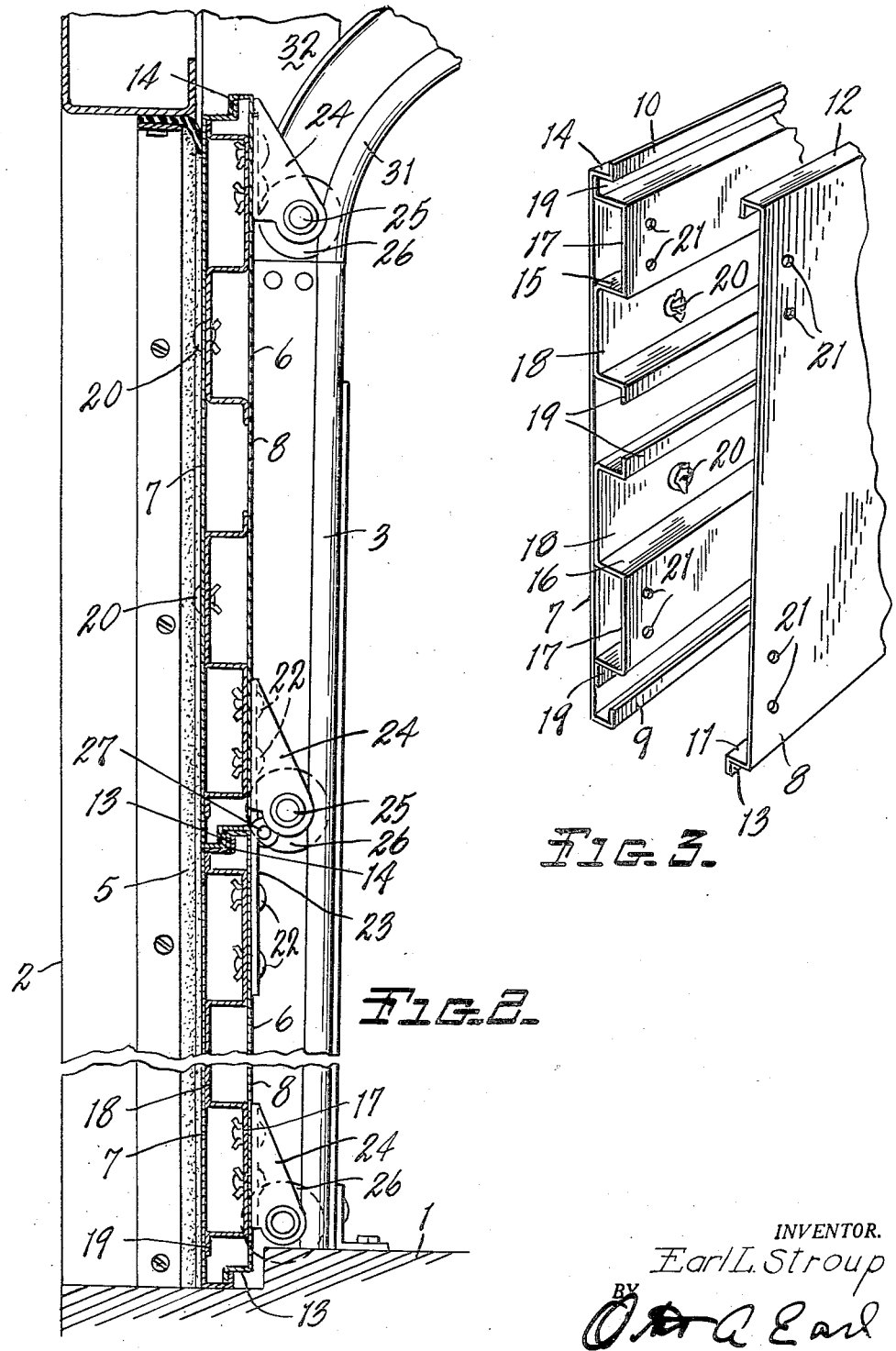

United States Patent Office 2,827,115
Patented Mar. 18, 1958

2,827,115

UPWARDLY ACTING DOOR ASSEMBLY AND SECTIONS THEREFOR

Earl L. Stroup, Hartford City, Ind., assignor to Overhead Door Corporation, Hartford City, Ind.

Application July 29, 1955, Serial No. 525,160

6 Claims. (Cl. 160—229)

This invention relates to an upwardly acting door assembly of the hingedly connected section type and sections therefor formed of sheet metal.

The main objects of this invention are:

First, to provide an upwardly acting door assembly comprising a plurality of hingedly connected sections in which the sections are formed mainly of relatively light sheet metal stock and at the same time are strong and rigid and provided with combined hinge brackets and spacer members which effectively support and distribute the stresses incident to the operation of the door.

Second, to provide an upwardly acting door assembly which is well adapted for use in closed truck bodies, trailers, freight cars and other motive vehicles and likewise is also desirable for use in other relations.

Third, to provide a door section adapted for use in a multiple section upwardly acting door which may be very economically produced as to parts and assembly thereof and at the same time is very strong and rigid.

Objects relating to details and economies of the invention will appear from the description to follow. The invention is defined and pointed out in the claims.

A preferred embodiment of the invention is illustrated in the accompanying drawing, in which:

Fig. 2 is an enlarged fragmentary view taken on a line corresponding to line 2—2 of Fig. 1.

Fig. 3 is a fragmentary exploded view of a partially assembled section illustrating structural details thereof.

Figure 1:
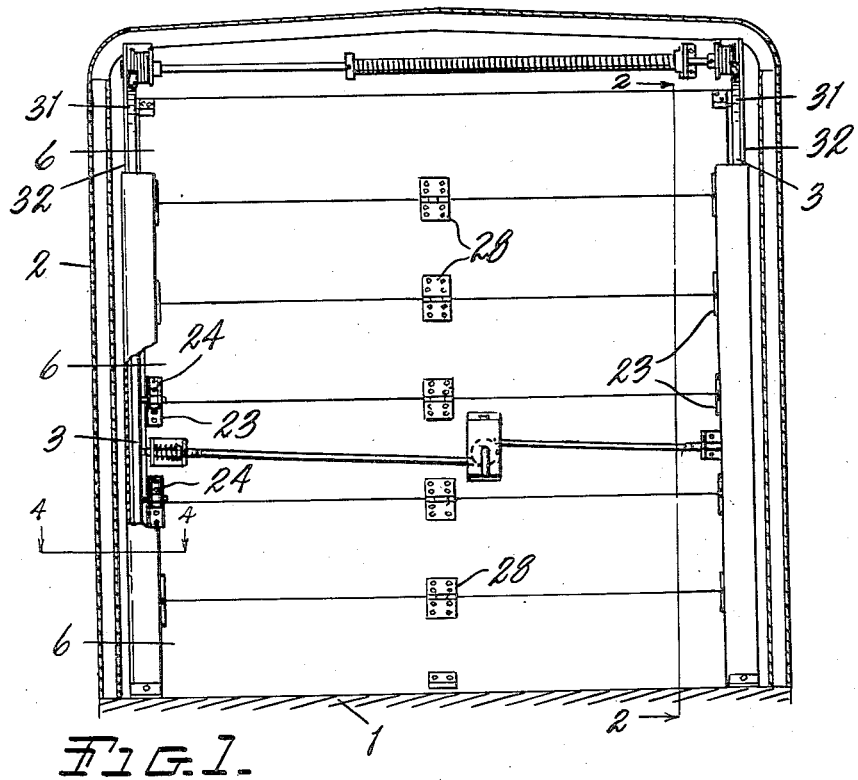
Fig. 1 is a fragmentary elevational view of a door assembly embodying my invention as embodied in a vehicle body which is shown partially in transverse section and partially conventionally.
Figures 4, 5:
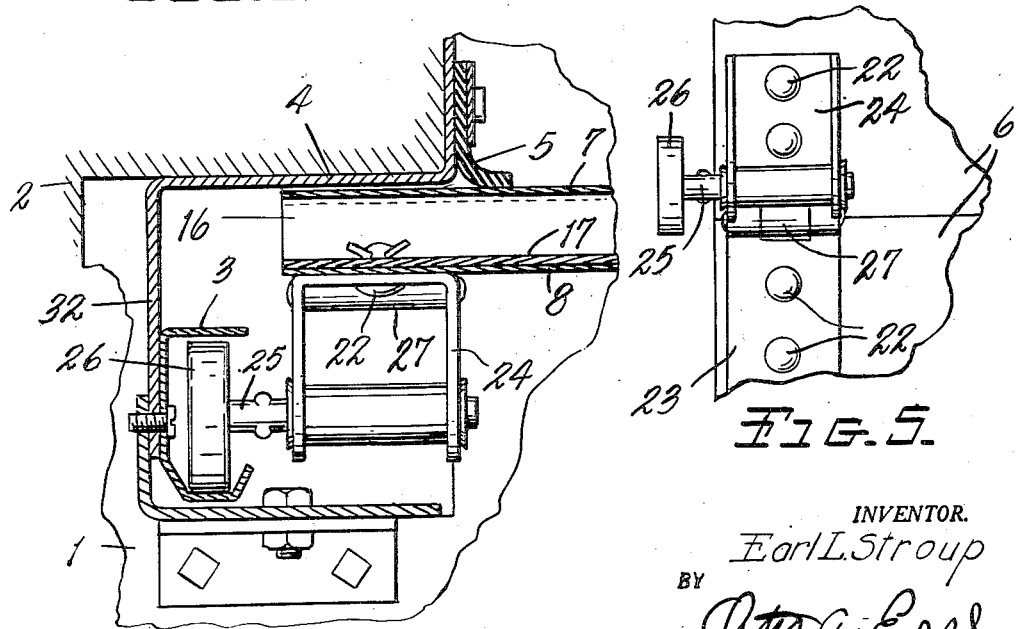
Fig. 4 is an enlarged fragmentary view in horizontal section on a line corresponding to line 4—4 of Fig. 1.
Fig. 5 is an enlarged fragmentary inside view illustrating details of the hinge connections for adjacent door sections and of the track engaging roller and its mounting bracket.

In the accompanying drawing I have illustrated my invention as embodied in a truck or trailer structure in which 1 represents the floor and 2 the housing, the rear end of which is closed by the upwardly acting door of my invention.

The track of the upwardly acting door assembly comprises a vertical section 3 and a curved section 31 which merges into a horizontal section not illustrated but which is disposed closely adjacent to the top of the housing or roof to support the door in open position. However, as tracks provided with horizontal sections are old in the art it is not illustrated. The track 3 is mounted on the brackets 32 so that the door is supported to close against the jamb 4 which is provided with flexible weather stripping 5.

The door comprises a plurality of sections designated generally by the numeral 6, the sections being duplicates. The door sections comprise inner and outer panels 7 and 8 formed of sheet metal. The outer panel is provided with inwardly projecting upwardly facing angled flanges 9 and 10 on its lower and upper edges respectively. The inner panel is provided with an inwardly projecting downwardly facing angled flange 11 on its lower edge and an inwardly projecting downwardly facing angle flange 12 on its upper edge.

The flanges 10 and 12 and the flanges 9 and 11 of the panels interlock when the panels are assembled providing an inwardly facing rabbet 13 at the lower edge of the section and an outwardly facing rabbet 14 at the upper edge of the section. These rabbets when the door is closed provide stepped joints between the sections to more effectively seal the joints and at the same time permitting the hinging or swinging of the sections relative to each other as the door is shifted from open to closed position and vice versa.

The section panels are reinforced and internally supported by two generally S-shaped double channel rails 15 and 16. The rails extend the full width of the panel section and one rail is inverted with respect to the other so that outwardly facing channel portions 17 are located at the top and bottom of the panel section and inwardly facing channel portions 18 are located intermediate of the height of the panel section. The channel rails are of such depth as to contact the insides of both panels 7 and 8. Marginal flanges 19 are turned from the upper and lower edges of the rails. Rivets or spot welds indicated at 20 secure the outer panel 7 to the rails.

The ends of the inner panel 8 and the sub-adjacent reinforcing rails 15 and 16 are bored with registering holes 21 for receiving blind rivets or other fasteners 22 that secure the inner panel to the rails and secure hinge plates 23 to the upper edges of the panel section and channel shaped roller brackets 24 to the ends of the lower edge of the panel section. The roller brackets support roller shafts 25 inwardly of the door and the shafts in turn support rollers 26 that roll in the tracks 3. The roller brackets also carry hinge knuckles 27 coacting with the hinge plates to join adjacent panel sections. On wide doors additional hinges 28 may be added. The pintles of the hinges are arranged in the plane of the upper steps of the rabbeted joints of the sections as is illustrated in Fig. 2.

The shaft carrying arms of the roller brackets 24 vary in length to compensate for the inwardly inclined relation of the upright portion of the track. The purpose of this is to guide the door into close engagement with the door jamb when the door is in closed position and provide effective clearance on the upward or opening movement of the door.

With this arrangement of parts the door sections may be formed of relatively light stock and at the same time the sections are strong and rigid and capable of withstanding severe usage which is likely to occur in trucks and trailers and other moving vehicles. However, I desire to point out that the structure is desirable for use or embodiment in upwardly acting doors for buildings.

I have not attempted to illustrate such embodiments or adaptations as it is believed that this disclosure will enable those skilled in the art to embody or adapt my invention as may be desired.

Having thus described my invention what I claim as new and desire to secure by Letters Patent is:

1. An upwardly acting door assembly including a plurality of door sections comprising outer and inner panels of sheet metal, the outer panel having inwardly offset upwardly facing angled flanges on its upper and lower edges, the inner panel having outwardly offset downwardly facing angled flanges on its upper and lower edges, the flanges of the panels being in interlocking engagement and coacting to provide an outwardly facing rabbet on the upper edge of the section and an inwardly facing rabbet on the lower edges thereof, the rabbets of adjacent sections coacting to provide a stepped joint, two separate reinforcing rails of a length corresponding approximately to the length of the panels and of a thickness corresponding to the spacing of the panels disposed horizontally between the panels adjacent their upper and lower edges, said rails being of double channels section with reversely facing channels and one rail being inverted with respect to the other to provide outwardly facing channels at the top and bottom of the door section with the webs of the channels lapped against and secured to the interior surfaces of said inner and outer panels, vertically extending flanges on the edges of said rails lapped against the interior surface of the adjacent panels of the sections, said rails and panels being fixedly secured together, coacting hinge members disposed on the inner sides of adjacent sections and provided with pintles disposed in the plane of the upper step of the joint therebetween, the hinge members being formed of sheet metal and secured to the ends of the rails disposed between the panels, said hinge members being secured to the sections by fasteners disposed therethrough and through said rails.

2. An upwardly acting door assembly including a plurality of door sections comprising outer and inner panels of sheet metal, the outer panel having inwardly offset upwardly facing angled flanges on its upper and lower edges, the inner panel having outwardly offset downwardly facing angled flanges on its upper and lower edges, the flanges of the panels being in interlocking engagement and coacting to provide an outwardly facing rabbet on the upper edge of the section and an inwardly facing rabbet on the lower edges thereof, the rabbets of adjacent sections coacting to provide a stepped joint, two separate reinforcing rails of a thickness corresponding to the spacing of the panels disposed horizontally between the panels adjacent their upper and lower edges, said rails being of double channel section with reversely facing channels and one rail being inverted with respect to the other to provide outwardly facing channels at the top and bottom of the door section with the webs of the channels lapped against and secured to the interior surfaces of said inner and outer panels, vertically extending flanges on the edges of said rails lapped against the interior surface of the adjacent panels of the sections, said rails and panels being fixedly secured together, coacting hinge members disposed on the inner sides of adjacent sections and provided with pintles disposed in the plane of the upper step of the joint therebetween, the hinge members being secured to the ends of the rails disposed between the panels, said hinge members being secured to the sections by fasteners disposed therethrough and through said rails.

3. An upwardly acting door assembly including a plurality of door sections comprising outer and inner panels of sheet metal, the outer panel having inwardly offset upwardly facing angled flanges on its upper and lower edges, the inner panel having outwardly offset downwardly facing angled flanges on its upper and lower edges, the flanges of the panels being in interlocking engagement and coacting to provide an outwardly facing rabbet on the upper edge of the section and an inwardly facing rabbet on the lower edges thereof, the rabbets of adjacent sections coacting to provide a stepped joint, two separate reinforcing rails of a length corresponding approximately to the length of the panels and of a thickness corresponding to the spacing thereof disposed horizontally between the panels adjacent the upper and lower edges thereof, said rails being of double channel section with reversely facing channels and one rail being reversed with respect to the other to provide channel webs at the inside of the upper and lower edges of the inner panels, coacting hinge members disposed on the inner sides of adjacent sections and provided with pintles disposed in the plane of the upper step of the joint therebetween, said hinge members being secured to the sections by fasteners disposed therethrough and through said inner panels and rails, and fasteners connecting the other channels of said rails to the outer panels.

4. An upwardly acting door assembly including a plurality of door sections comprising outer and inner panels of sheet metal, the outer panel having inwardly off-set upwardly facing angled flanges with upwardly extending arms on its upper and lower edges, the inner panel having outwardly off-set downwardly facing angled flanges with downwardly extending arms on its upper and lower edges, the flanges of the panels being in interlocking engagement with said upwardly and downwardly extending arms in lapped relation and coacting to provide rabbets on the edges of the sections coacting to provide a stepped joint, connecting hinge members disposed on the inner sides of adjacent sections, and reinforcing spacers disposed between the panels in spacing relation thereto and in opposed relation to the hinge members thereof, the hinge members being secured to the sections by means disposed through said hinge members.

5. A door section comprising outer and inner side panels of sheet metal, the outer panel having inwardly offset upwardly facing angled flanges with upwardly extending arms on its upper and lower edges, the inner panel having outwardly offset downwardly facing angled flanges with downwardly extending arms on its upper and lower edges, the flanges of the panels being in interlocking engagement with said upwardly and downwardly extending arms in lapped relation and coacting to provide oppositely facing rabbets on the edges of the section, and two separate reinforcing spacer rails of double channel section with reversely facing channels disposed between the panels, one of said rails being reversed with respect to the other to provide a channel wall at the upper and lower edges of the inner panel, the webs of said channel sections fixedly secured to the panels, and hinge members secured to the upper and lower edges of the inner panel by fasteners passed through the panel and said channel walls.

6. A door section comprising outer and inner side panels of sheet metal, the outer panel having inwardly offset upwardly facing angled flanges with upwardly extending arms on its upper and lower edges, the inner panel having outwardly offset downwardly facing angled flanges with downwardly extending arms on its upper and lower edges, the flanges of the panels being in interlocking engagement with said upwardly and downwardly extending arms in lapped relation and coacting to provide rabbets on the edges of the sections.

References Cited in the file of this patent
UNITED STATES PATENTS

| 1,680,538 | Gross | Aug. 14, 1928 |
| 1,761,037 | Gross | June 3, 1930 |
| 2,061,304 | Graham | Nov. 17, 1936 |
| 2,575,255 | Blodgett | Nov. 13, 1951 |
| 2,689,003 | Helbert et al. | Sept. 14, 1954 |